July 14, 1942.　　　W. A. KELSO　　　2,289,710
ROPE FASTENER
Filed Jan. 6, 1941

Inventor
Willis A. Kelso
By Jack Snyder
Attorney

Patented July 14, 1942

2,289,710

UNITED STATES PATENT OFFICE 2,289,710

ROPE FASTENER

Willis A. Kelso, Sharpsburg, Pa.

Application January 6, 1941, Serial No. 373,218

1 Claim. (Cl. 24—131)

This invention relates to a rope fastener, and while primarily intended and designed for use in connection with clotheslines, it will be obvious that the device may be employed in connection with ropes used for any other purposes wherein it is found to be applicable.

Important objects and advantages of the invention are to provide a fastener of the character described, which may be successfully and conveniently employed for securing the end of a clothesline to the running length of another clothesline, which may be used for readily and quickly connecting together the ends of ropes, which is simple in its construction and arrangement, durable and efficient in its use, and comparatively economical in its manufacture.

With the foregoing and other objects in view which will appear as the description proceeds the invention resides in the novel construction, combination and arrangement of parts herein specifically described and illustrated in the accompanying drawing, but it is to be understood that changes in the form, proportions and details of construction may be resorted to that come within the scope of the claim hereunto appended.

In the drawing wherein like numerals of reference designate corresponding parts throughout the several views.

Figure 1:
Figure 1 is a top plan view of a rope fastener constructed in accordance with the invention.

Referring in detail to the drawing, my improved fastener comprises an elongated body 1 constructed of a unitary length of fairly heavy wire. The body is corrugated throughout its length forming a plurality of substantially V-shaped corrugations consisting of alternate elevations of considerable height and depressions of corresponding depths. The corrugations are regularly aligned and generally and preferably provide a flat body structure.

One end of the body 1 is formed to provide an attaching eye 2, which extends flatly parallel to the flatwise position of the body, but which is laterally offset with respect to the longitudinally disposed body. The other end of the body is formed with a retaining lug 3, which extends laterally at right angles to the adjacent portion of the body and in a direction opposed to the lateral disposition of the eye 2.

Figure 2:
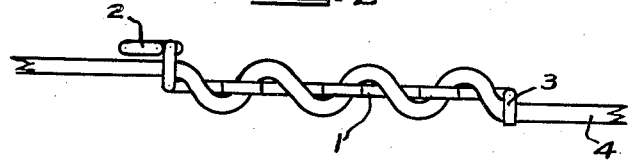
Figure 2 is a side elevational view thereof attached to a running length of rope.
Figure 3:
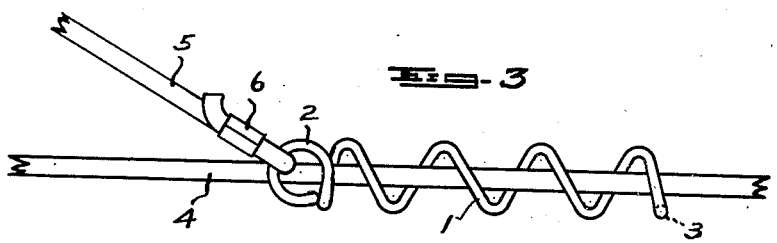
Figure 3 is a top plan view of the device connected with the end of one rope and being attached to the running length of another rope.

The fastener may be detachably connected with a clothesline or other type of rope 4, by intertwining the latter throughout the corrugated length of the body, whereby the engaged portion of the rope itself will be formed with a plurality of corrugations, as clearly illustrated in Figure 2.

The fastener is connected to the rope 4 by simply grasping the body 1 by the eye 2, and then with a circular motion turn said body around the rope until the latter is intertwined in all of the corrugations embodied in the body. The sinuous conformation of the rope when engaged by the fastener, in the manner stated, will secure said rope against slippage through the body when the rope is drawn taut.

My improved fastener is particularly adapted for connecting the end of one rope 5, at any point to the taut running length of another rope 4 if required for any reason or purpose. The end of the rope 5 may be secured in the eye 2, as indicated at 6, or in any other suitable manner, and the rope 4 is intertwined in the corrugated body 1, in the manner herein before set forth.

The obvious purpose and function of the retaining lug 3 at one end of the body 1 is to prevent the accidental unwinding or disengagement of the rope from the body. The formation of the eye 2, in the manner set forth, provides a retaining element at the other end of the body.

Figure 4:
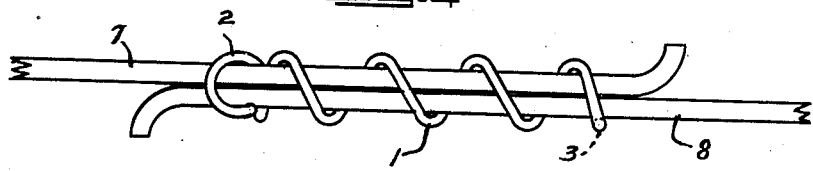
Figure 4 is a top plan view of the fastener employed for joining together the ends of ropes.

Figure 4 illustrates the use of the fastener in connecting the adjacent ends of ropes 7 and 8. The latter, extending in opposite directions relatively to each other, preferably have the end portions thereof passed through the eye 2, and then are combinedly intertwined in the corrugations throughout the length of the body. Such connection of the rope ends is doubly secured owing to the engagement of the engaged rope end portions against each other when intertwined and drawn taut in the corrugated body, as stated.

The present invention provides a most simple and efficient device of its kind, which may be cheaply manufactured, and successfully employed in the manner and for the purposes set forth.

What I claim is:

A rope fastener comprising a body constructed of a unitary length of wire formed to provide a plurality of substantially-V-shaped corrugations for engaging the rope, said corrugations being of uniform size and of considerable height and depth, an attaching eye formed at one end of said body and being laterally offset with respect to the longitudinal disposition of the latter and extending flatly parallel to the flatwise disposition of the latter, and a retaining lug formed at the other end of said body and extending laterally at right angles to the flatwise disposition of said body and in the direction opposed to the lateral offset disposition of said attaching eye.

WILLIS A. KELSO.